Patented Feb. 4, 1930

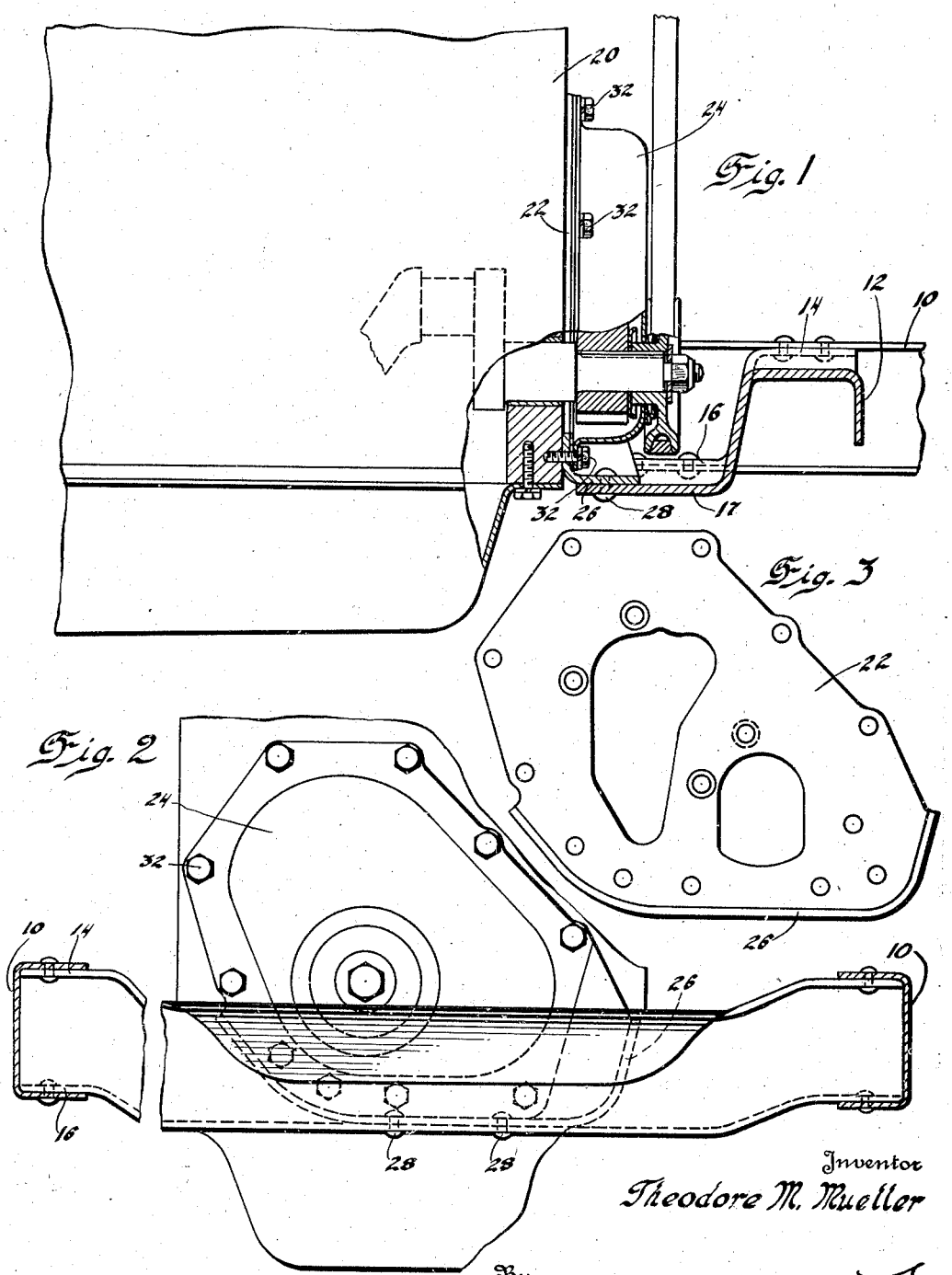

1,746,223

UNITED STATES PATENT OFFICE

THEODORE M. MUELLER, OF PONTIAC, MICHIGAN, ASSIGNOR TO GENERAL MOTORS CORPORATION, OF DETROIT, MICHIGAN, A CORPORATION OF DELAWARE

PRESSED-STEEL TIMING-GEAR COVER

Application filed September 2, 1927. Serial No. 217,220.

This invention relates to an engine support and has particularly to do with the means for supporting an internal combustion engine on the chassis of an automotive vehicle.

The object of the invention is to provide an improved and simplified means for supporting the front end of the engine on the chassis of an automotive vehicle. The principal objects of the invention are the simplification of the structure involved and elimination of unnecessary parts.

Other objects and advantages of the invention will appear in the course of the following description, taken in connection with the accompanying drawing and appended claims.

In the drawing:

Figure 1 is a side elevation with parts broken away.

Figure 2 is a front view.

Figure 3 is a perspective view of the timing gear plate.

Referring to the drawing, the numeral 10 indicates the two longitudinal frame members of the chassis of an automotive vehicle on which is supported the cross member or supporting web 12. The web 12 has a forwardly bent portion 14 riveted to the upper horizontal portion of the frame member 10 and a rearwardly bent portion 16 riveted to the lower horizontal portion of the frame member 10. The intermediate part of the lower rearwardly extending portion 16 is bent lower than the lower level of the side members 10, as indicated at 17, and it is on this horizontal supporting flange 17 that the front end of the engine rests.

The numeral 20 indicates the front end of a conventional internal combustion engine, on the front end of which are the pressed metal timing gear plate 22 and timing gear cover 24. The plate 22 is flat, except for its lower flange, and fits flush against the front end of the engine block, being fixed thereto by means of bolts extending through the numerous bolt holes in the plate and in the engine block, and is provided with apertures for accommodation of the crank shaft and cam shaft and their respective gears. The plate 22 is provided on its lower side with a forwardly extending flange 26 which is formed with a lower horizontal portion and curved side portions. The bowl shaped timing gear cover 24 fits over the timing gears and plate 22 and the plate 22 and cover 24 are fixed to the engine block by means of bolts 32, each of which extends through both the plate 22 and cover 24. The horizontal portion of the flange 26 rests on the horizontal portion 17 of the supporting web 12 and is fixed thereto by means of rivets 28.

I claim:

1. In an automotive vehicle including a frame, a support mounted on said frame, an internal combustion engine including a front cover plate, a supporting element secured to the engine between said cover plate and engine and provided with a flange, and means connecting said flange to the support.

2. In an automotive vehicle including side frame members, a transverse support connecting said frame members, an internal combustion engine including a front cover plate, a supporting element secured to the plate, a supporting element secured to the engine between said cover plate and engine and provided with a flange, and means connecting said flange to the support.

3. In an automotive vehicle including a frame, a support mounted on the frame, an internal combustion engine including a front cover plate, a supporting element secured to the engine between said cover plate and engine and provided with a flange including a horizontal lower portion and curved side portions, and means connecting said horizontal portion to the support.

4. In an automotive vehicle including a frame, an internal combustion engine including a front cover plate, a member secured to the engine between the cover plate and engine and having a lateral projection, and means connecting said projection to the frame.

5. In combination with a vehicle frame, an internal combustion engine, a front cover for said engine, and a supporting element secured to the engine between said engine and said cover, and adapted to be connected to said frame.

6. In an automotive vehicle including a frame, an internal combustion engine including a front cover plate, a supporting element secured to the engine between said cover plate and engine, and provided with a flange, and means connecting said flange to the frame.

In testimony whereof I affix my signature.

THEODORE M. MUELLER.